Patented May 2, 1939

2,156,577

UNITED STATES PATENT OFFICE 2,156,577

PROCESS OF SEPARATING MERCAPTANS CONTAINED IN A HYDROCARBON LIQUID

David Louis Yabroff, Berkeley, and Ellis R. White, Albany, Calif., assignors to Shell Development Company, San Francisco, Calif., a corporation of Delaware No Drawing. Application February 8, 1937, Serial No. 124,688

9 Claims. (Cl. 196—30)

This invention relates to the removal of weakly acid-reacting organic substances from solutions in organic liquids of the type of hydrocarbons, and in particular deals with the removal of mercaptans from petroleum distillates.

It is frequently necessary to eliminate small quantities of organic weakly acid components such as mercaptans and phenols, etc., from their solutions in substantially neutral hydrocarbon type liquids. The term, hydrocarbon type liquids, as herein used, refers to water-insoluble normally liquid organic substances which are neutral or slightly basic, such as the liquid hydrocarbons derived from petroleum, benzene, toluene, xylene, substituted normally liquid hydrocarbons which are substantially insoluble in water, for instance chlorinated hydrocarbons, of which chlorethane, ethylene dichloride, trichlorethylene, carbon tetrachloride, chlorpropane, chlorbutylene, chlorbenzene, brombenzene are examples; or nitro hydrocarbons, for example nitroethane, nitrobenzene; or other nitrogen containing hydrocarbons such as amyl or higher amines, aniline, pyridine, petroleum bases, etc.

It is the object of this invention to provide a method whereby acid-reacting organic substances of the type hereinbefore described can be removed efficiently and at low cost from solutions in hydrocarbon type liquids. As a particular application, it is the object to remove mercaptans from strongly sour gasoline distillates to reduce their sulfur content and to produce sweet or nearly sweet gasolines of improved octane numbers and lead susceptibilities, requiring but little after treatment for complete sweetening, if any.

In the U. S. Patent 2,059,075 by Yabroff and Givens it was shown that the efficacy of the removal of acidic organic substances from their solution in hydrocarbon type liquids by means of alkaline-reacting solutions which are substantially immiscible with said liquids, depends largely on the solvent power of the alkaline solution for the organic acids and on the alkalinity of the former. As a means for producing aqueous alkaline solutions of good solvent power for organic acids the use of quaternary ammonium bases was taught. The addition of alkali metal fatty acid salts of 3 to 5 carbon atoms to aqueous alkali hydroxide for the purpose of increasing the solvent power of the latter for mercaptans and the like was disclosed in our co-pending application Serial No. 118,920, filed January 2, 1937.

Now we have discovered that the alkali salts of certain lower substituted fatty acids, in particular amino or hydroxy fatty acids, have the ability of increasing the extraction power of aqueous alkali toward organic acids to a remarkable degree by virtue of the combination of two properties, namely high solubility in aqueous caustic and high solubility enhancing effect. The expression "solubility enhancing effect" as herein used relates to the increase in the extraction power, i. e., the difference in extraction power of the aqueous caustic for the organic acids before and after the addition of said alkali salts herein called the solubility promoters.

The terms alkali, alkali hydroxide, or caustic alkali refer to all strongly alkaline bases, i. e., the alkali metal and ammonium hydroxides, alkaline earth hydroxides, quaternary ammonium bases, alkali carbonates and bicarbonates, etc., although the hydroxides of the alkali metals are preferred. Especially useful are the sodium and potassium hydroxides, as being the strongest of the easily available bases. While sodium hydroxide is more generally used because of its lower cost, potassium hydroxide is usually more effective.

The salts which are used according to this invention are the alkali salts of aliphatic carboxylic acids of 4 to 7 carbon atoms which possess, besides their carboxyl group, one neutral or alkaline reacting polar group. Of the various possible substitution groups which include hydroxyl, amino, halide, nitro, nitrile, sulfone, etc., radicals, we prefer the hydroxyl and amino radicals, not only because hydroxy and amino fatty acids of the specified number of carbon atoms are readily available, but also because they are substantially resistant to hydrolysis with steam in the presence of strong caustic alkali, the term hydrolysis as herein used including saponification. Resistance to hydrolysis is an important factor in the regeneration of spent caustic alkali solutions containing solubility promoter.

The polar substitution group may be situated in any position relative to the carboxyl group, except that, if the position is other than alpha position, ring compounds may be formed, some of which are less desirable than the open chain compounds.

Preferred alkali salts are the sodium and potassium salts, the potassium salt in many instances giving superior results because of a greater solubility in strong caustic alkali solutions.

In the above referred to co-pending application, Serial No. 118,920, filed January 2, 1937, we have shown that the maximum extraction power for mercaptans and the like obtainable with an alkali metal carboxylate depends on a combination of three factors: Solubility of the carboxylate in the caustic alkali, concentration of the caustic alkali, and the effect of the acid radical.

The higher the concentration of the solubility promoter, the greater is the solubility enhancing effect, and consequently it is desirable to incorporate into the caustic alkali solution the maximum amount of the carboxylate which can be dissolved, i. e., it is desirable to use aqueous caustic alkali solutions substantially saturated with carboxylate.

The concentration of the caustic alkali may vary within wide limits. However, the higher the caustic alkali concentration the lower as a general rule are the solubilities of the carboxylates. While good results have been obtained with relatively dilute caustic alkali solutions having normalities below about 2, we generally prefer stronger solutions having normalities preferably between 2 to 6. Depending upon the change of solubilities of various alkali salts in the aqueous caustic alkali with increasing caustic concentration, it is with some salts advantageous to use caustic alkali concentrations near the lower limit of the preferred range and with other salts near the upper limit.

As to the effect of the acid radical we have found that of the substituted fatty acid salts herein described, those of less than 4 carbon atoms possess low solubility enhancing effects, with the result that they have relatively low maximum K values in spite of good solubilities, K being the concentration of the weak organic acids to be extracted, dissolved as salts in the aqueous caustic alkali phase divided by their concentration in the hydrocarbon phase, when the two phases are in equilibrium with each other. On the other hand, salts having more than 7 carbon atoms, although possessing favorable solubility enhancing properties, are insufficiently soluble in strong aqueous caustic alkali to have effects of practical value. Even within the limits of 4 to 7 carbon atoms, maximum K values obtainable with the salts differ considerably as may be seen from the examples below, in which the maximum K values for normal amyl mercaptan as between iso-octane and 5 normal sodium hydroxide solution saturated with different salts, are given.

| Salt | Number of C atoms in salt | K value |
| --- | --- | --- |
| None | | 1.0 |
| Sodium alpha-amino isobuytyrate | 4 | 7.6 |
| Sodium alpha-hydroxy n-butyrate | 4 | 5.1 |
| Sodium alpha-hydroxy valerate | 5 | 37 |

Hydroxy and amino valerates and particularly alpha hydroxy and alpha amino valerates are preferred because they combine highest K values with stabilities which make them adaptable for repeated regeneration without material decomposition.

Instead of using individual fatty acid salts of the type herein described, mixtures of several acids may be used as well. For instance, amino fatty acids such as may be obtained in the hydrolysis of proteins with hydrochloric acid are useful, particularly if the average content of the carbon atoms per molecule of the mixture so produced is between the limits of 4 to 7. Suitable fractions may be isolated from hydrolytic decomposition mixtures of proteins by conventional fractionation as distillation, solvent extraction, etc. Moreover, the mixtures need not consist altogether of the free carboxylic acids, but a portion thereof may be in the form of anhydrides having ring structures, for example of the type of betain.

Although the solubilities of the fatty acid salts increase with increasing temperatures, the application of elevated temperatures for extraction offers few advantages, if any, because the extraction power of caustic alkali containing solubility promoter for weak acids, such as mercaptans, decreases with increasing temperatures. Therefore we usually prefer to operate at temperatures between about 0° to 60° C.

The caustic alkali solution containing the requisite amount of solubility promoter may simply be mixed with the hydrocarbon distillate; the resulting mixture is then allowed to separate, the two liquids are separately withdrawn and the spent caustic alkali may be subjected to a treatment to recover at least the solutizer. For more efficient extraction, however, we prefer to flow the caustic solution and hydrocarbon type liquids in countercurrent to each other through a series of continuous treaters.

In the following comparative example the efficacy of a representative solubility promoter of the group herein described is demonstrated. A California straight run gasoline containing .1606% mercaptan sulfur was extracted with 10% by volume of a 5 N aqueous sodium hydroxide. The mercaptan sulfur left in the gasoline was .0346%.

The aqueous caustic alkali was then saturated with sodium alpha hydroxy valerate and a sample of the raw gasoline was extracted with 10% by volume of the resulting solution. The mercaptan sulfur was reduced to .0110%.

It is frequently not economical to carry the extraction of mercaptans to the point of sweetening. In such a case sweetening may be effected after extraction by any of the conventional methods as doctor treatment, treatment with hypochlorite, oxidation with air in the presence of suitable catalysts as copper compounds, lead sulfide, nickel sulfide, if desired in the presence of caustic, etc. Since the amount of mercaptans left after extraction is very small, a light sweetening treatment is usually sufficient and the disulfides so formed are insufficient in quantity materially to reduce the knock ratings and lead susceptibilities of gasolines so treated.

Methods for the regeneration of the spent caustic alkali containing solubility promoter or the recovery of the solubility promoter depend largely upon the type of acids which were absorbed. If mercaptans only have been absorbed to form alkali mercaptides, the spent caustic alkali solution containing the mercaptides can be regenerated effectively by steaming, provided the polar substitution radical is not subject to hydrolysis or saponification under such conditions. Under some circumstances, oxidation methods may be used to convert the mercaptides to disulfides.

Since the salts of the acids herein described are substantially non-volatile, regeneration by steaming of the spent caustic alkali containing same is comparatively easy, since no precautions need be taken to safeguard against losses by vaporization. Steaming can be carried out simply by blowing steam through the spent caustic alkali solution containing solubility promoter, which may be maintained as a pool or by flowing it downward through a suitable tower in countercurrent to the ascending steam, or in any other suitable manner. The used steam, which after passage through the spent caustic solution carries with it mercaptans, need not be carefully fractionated as in the case of volatile solubility promoters, since it contains no solubility promoter.

In order to render the caustic alkali regenerable and to permit its continued recirculation without substantial deterioration, we usually pretreat the hydrocarbon type liquid containing mercaptans and stronger acids in a suitable manner to remove the stronger acids, as by washing with water to remove acetic acid and the like, scrubbing it with a caustic alkali solution or with a solution free from solubility promoters of tripotassium phosphate or the like to remove hydrogen sulfide, and/or fractionally distilling it, and thereafter subjecting the pretreated liquid to the treatment hereinbefore described.

We claim as our invention:

1. In the process of separating organic reacting substances contained in a water-insoluble neutral or basic organic liquid, the steps comprising treating said liquid with an aqueous solution of a strong base containing a substantial amount of a dissolved salt of an aliphatic amino carboxylic acid having from 4 to 7 carbon atoms, under conditions to absorb at least a portion of said acid reacting substances in said aqueous solution and to form two liquid layers, one comprising the aqueous solution containing acid reacting substances and the other consisting essentially of treated organic liquid, and separating the layers.

2. The process of claim 1 in which the aliphatic carboxylic acid salt is an alpha amino valerate.

3. The process of claim 1 in which the aliphatic carboxylic acid salt is a salt of an alkali metal.

4. The process of claim 1 in which the aqueous solution is substantially saturated with the salt.

5. The process of claim 1 in which the base is an alkali metal hydroxide.

6. The process of claim 1 in which the aqueous solution of the base is a 2 to 6 normal alkali metal hydroxide solution.

7. The process of claim 1 in which the carboxylic acid is an alpha amino carboxylic acid.

8. In the process of separating organic acid reacting substances contained in a water-insoluble neutral or basic organic liquid, the steps comprising treating said liquid with an aqueous solution of a strong base containing a substantial amount of a dissolved salt of an aliphatic amino carboxylic acid having from 4 to 7 carbon atoms obtained in the decomposition of proteins by hydrolysis, under conditions to absorb at least a portion of said mercaptans in said aqueous solution and to form two liquid layers, one comprising the aqueous solution containing mercaptans and the other consisting essentially of treated hydrocarbon liquid, and separating the layers.

9. In the process of separating mercaptans contained in a hydrocarbon liquid, the steps comprising treating said liquid with an aqueous solution of an alkali metal hydroxide containing a substantial amount of a dissolved salt of an aliphatic amino carboxylic acid having from 4 to 7 carbon atoms, under conditions to absorb at least a portion of said mercaptans in said aqueous solution and to form two liquid layers, one comprising the aqueous solution containing mercaptans and the other consisting essentially of treated hydrocarbon liquid, and separating the layers.

DAVID LOUIS YABROFF.
ELLIS R. WHITE.